Patented Nov. 3, 1936

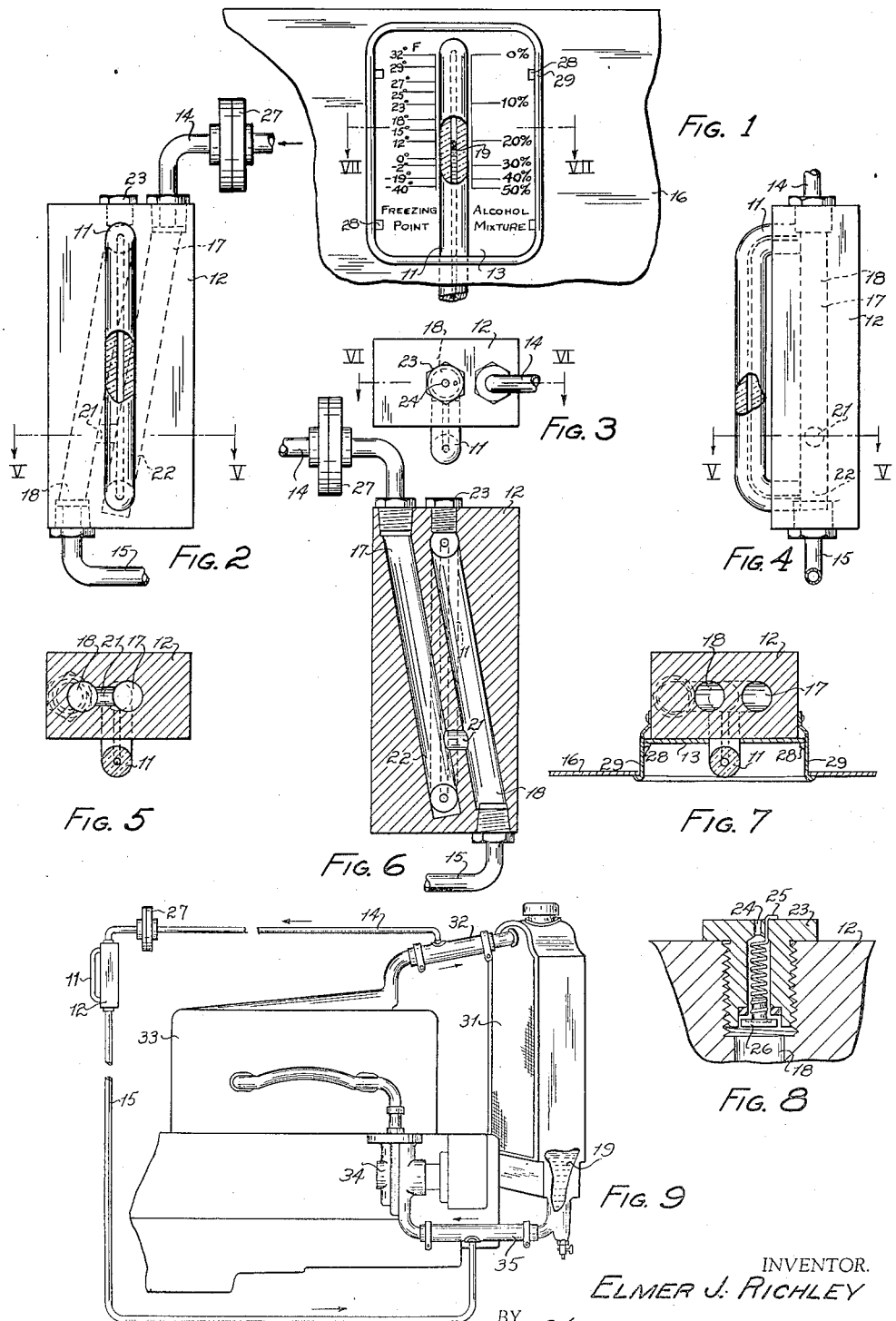
Nov. 3, 1936.  E. J. RICHLEY  2,059,961
CAPILLARIMETER
Filed Oct. 16, 1935
INVENTOR.
ELMER J. RICHLEY
BY Morton S. Brockman
ATTORNEY.

2,059,961

UNITED STATES PATENT OFFICE 2,059,961

CAPILLARIMETER

Elmer J. Richley, Cleveland, Ohio

Application October 16, 1935, Serial No. 45,238

7 Claims. (Cl. 73—51)

This invention relates to improvements in capillarimeters, and particularly to gauges used to determine the proportion of alcohol in liquid mixtures, and which also indicates the freezing point of a liquid in an automobile radiator.

During the winter months in the colder climates motorists are obliged to mix with the water in an automobile radiator some anti-freeze liquid to insure circulation of the mixture in the cooling system. Alcohol, glycerin, or other liquids having a low freezing point are commonly used for this purpose. The alcohol especially is added from time to time depending on the temperature. As the temperature increases the alcohol boils out faster than the water so that as the automobile is driven for a while during variations of temperature the motorist does not have an accurate knowledge of the condition of the radiator liquid. Damage often occurs to the motor when the cooling system liquid has a freezing point higher than a sudden drop in temperature warrants.

The objects of my invention are; first, to provide a gauge that will indicate to a motorist the freezing point of a liquid in an automobile radiator; second, to indicate by the same gauge the proportion of alcohol or other anti-freeze liquid in the radiator solution; third, to provide a gauge of this type that is compact and which can be attached to the dashboard of an automobile, and readily observed; and fourth, to construct a gauge of this type that is simple of construction and easily and economically manufactured and installed.

Other objects and a fuller understanding of my invention may be had by referring to the following specification taken in conjunction with the accompanying drawing, and in which:

Figure 1 is a front view of the instrument mounted on the dashboard of an automobile.

Figure 2 is a front view of the instrument with the scale removed.

Figure 3 is a top view of the instrument with the scale removed.

Figure 4 is a side view of the instrument without the scale.

Figure 5 is a cross-sectional view of the instrument taken along the lines V—V of Figures 2 and 4.

Figure 6 is a cross-sectional view of the instrument taken along the line VI—VI of Figure 3.

Figure 7 is a cross-sectional view of the gauge taken along the line VII—VII of Figure 1.

Figure 8 is an enlarged cross-sectional view of the overflow valve.

Figure 9 is a diagrammatic view of the way the instrument is connected to the cooling system of the automobile.

My invention utilizes the phenomena or force which causes a liquid to rise higher on the inside of a small diameter tube, open at both ends, when its lower end is inserted in a liquid, than the level of the liquid on the outside of the tube. This force is commonly known as capillary action. The extent of such action is determined by surface tension, cohesion and adhesion of the molecules of the liquid in the tube. Hence, the height to which a liquid will rise under capillary action depends upon the inside diameter and surface of the tube and the chemical composition of the liquid. Both water and alcohol are subject to capillary action. The water, however, rises higher in a capillary tube than the alcohol under the same conditions, and the mixtures of the two liquids rise to heights which varies according to the concentrate of the solution.

I find that in using a glass tube having an inside diameter of approximately one-half millimeter the difference in capillarity of the two liquids is quite noticeable; and that variations in capillarity due to the different proportions of the liquids in mixture can be readily observed.

In the drawing I show a U-shaped glass tube 11, mounted on a chamber 12. On the front surface or portion of the chamber I attach a scale 13. To the top of, or to the entrance to the chamber I attach a hose or pipe 14, which leads to the water-pump 34, or the pressure side of the cooling system. To the bottom of the chamber I attach another pipe 15, which leads to the return hose 35, of the radiator. The aforementioned parts are so constructed and assembled that they may be mounted on the dashboard 16, of an automobile, as illustrated in Figure 1.

The chamber 12, as I have illustrated it consists of a block of metal or other suitable material in which there is a longitudinal cavity 17, extending downwardly from the top to almost the bottom. Alongside of the cavity 17, there is a channel 18, extending from the top through to the bottom. Approximately a quarter of the way from the bottom of the chamber 12, a second channel or by-pass 21, connects the cavity 17, with the channel 18. The portion of the cavity 17, below the by-pass 21, becomes a receptacle or a reservoir 22, for the liquid to be tested. The lower portion of the reservoir 22, is tapped and the bottom of the glass tube 11, is inserted in the hole thus made, and sealed therein. The upper portion of the channel 18, is also tapped and the top of the glass tube 11, is inserted in this hole and is also sealed therein. The top of the cavity 17, is threaded as is also the bottom of the channel 18, so that pipes 14 and 15, can be connected to the chamber.

With this construction the radiator liquid enters under pressure through pipe 14, fills the cavity 17, is forced out through the small connecting by-pass 21, into the lower part of channel 18, and out through pipe 15, back to the radiator. The passageway of by-pass 21, is necessarily smaller than the passageway of cavity 17, in order to force the liquid 19, accumulating in the reservoir 22, out through the tube 11, into the upper part of channel 18, and then back to the radiator 31, by way of the pipe 15. This construction is necessary in order to have the reservoir liquid in circulation making it representative of the liquid 19, in the radiator 31.

The top of the channel 18, is open admitting air into the glass tube 11. This channel 18, is also slightly larger in diameter than the cavity 17, and a little larger than the openings of the by-pass 21, and the tube 11, combined so that the return course of the liquid is through pipe 15, instead of overflowing the channel 18. However in case the motor is speeded and the pressure becomes too great, the liquid has a tendency to overflow. I, therefore, provide a simple automatic valve for the top of channel 18, which prevents the liquid from overflowing, but which admits air when the pressure is reduced.

This valve is shown in Figure 8, and consists of a threaded cap 23, having an air vent 24, an expansion spring 25, attached to the inside top of the cap, and a gate 26 fastened to the spring 25, outside and around the threaded rim of the cap. The aforementioned parts being so arranged that the pressure of the liquid will close the gate 26, before overflowing the channel 18, but will admit air when the gate 26, is opened by the spring 25.

Frequently automobile radiator solutions contain particles of solid matter, so in order to prevent the instrument from clogging, especially the tube 11, I insert a small screen or filter 27, in the pipe 14, before the pipe enters the cavity 17.

Generally the color of the radiator liquid is noticeable. The rust of the motor and radiator coils tint the liquid so that it can be observed through the tube 11. However, if the liquid is too clear to be seen some harmless dye can be added to the radiator mixture to insure easy reading and notations of the graduations on the scale 13.

In Figure 9, I show how the apparatus is connected to the automobile water cooling system in parallel with the motor. In this illustration the radiator 31, containing a liquid 19, has a hose 35, for admitting the liquid 19, into the motor 33, a pump 34, for intermittently filling and draining the receptacle and for circulating the liquid 19, under pressure, a hose 32, for returning the liquid 19, to the radiator 31, for cooling, and my capillarimeter consisting of chamber 12, tube 11, pipes 14 and 15, and filter 27.

When the motor is operating and the radiator liquid 19, is in circulation the tube 11, is completely filled, indicating that the cooling system is in order. However, for determining the condition of the radiator mixture or its freezing point, the best time for reading the gauge is shortly after the motor has stopped running, for then the liquid to be tested is at its normal operating temperature, and is thoroughly mixed. Also at that time the liquid in the upper portion of cavity 17, and in the channels 18 and 21, has drained out through the pipe 15, and air has entered through the valve 23, permitting the capillary force to act on the liquid remaining in the reservoir 22, and in the tube 11.

In Figure 1 of the drawing, I show the capillarity of the liquid 19 in the tube 11 and reaching on the scale 13, to a point indicated by 12° Fahrenheit on the left side and 20% on the right side. This reading would indicate to a motorist that the liquid 19 in the radiator 31 is composed by volume of 80% water and 20% methyl-alcohol and is a safe mixture for temperatures above 12° Fahrenheit.

While alcohol is the most commonly used antifreeze liquid used in automobile radiators, other liquids having other characteristics are also used. I, therefore, provide my gauge with removable and interchangeable scales each suited for a particular kind of anti-freeze liquid and graduated to compensate for other changes in the capillarity of the mixture. The scale 13, is simply a piece of heavy paper, celluloid, or other suitable material, slotted, marked, and graduated similarly to the scale calibrated for methyl-alcohol, and indicated by reference character 13, in Figures 1 and 7. The scale 13, indicates along the left side of the tube 11, the freezing temperature of the mixture in the reservoir 22, and on the right side the percentage or amount of anti-freeze liquid in the mixture. It is held in place by pieces of metal 28, made part of the frame 29, of the gauge.

While I have described my invention in its preferred form and while I have utilized certain specific terms and language herein, I desire to be understood that the present disclosures are illustrative rather than restrictive, and that no limitations upon the invention are intended, other than are imposed by the scope of the appended claims.

I claim as my invention:

1. A capillarimeter, comprising in combination, a reservoir containing a liquid, a feed pipe conveying said liquid to the reservoir, a channel adjacent the said reservoir, a drain pipe connected to the channel, a capillary tube inserted in the liquid in the reservoir and opening into the channel, a pump circulating the said liquid through the said feed pipe, reservoir, channel, tube and drain pipe, and means in said reservoir for maintaining the level of the liquid therein constant.

2. A capillarimeter, comprising in combination, a reservoir containing a liquid, a feed pipe conveying the liquid to the said reservoir, a channel adjacent to the reservoir, the said channel having a drain pipe connected to its lower end and a valve in its upper end, a by-pass connecting the channel and the reservoir, a capillary tube inserted in the liquid in the reservoir below the by-pass and opening into the channel above the by-pass, and means for circulating the liquid through the said feed pipe, reservoir, channel, tube and drain pipe.

3. A capillarimeter, comprising in combination, a reservoir containing a liquid to be tested, a feed pipe conveying the said liquid to the reservoir, the said feed pipe having a filter therein, a channel adjacent to the reservoir, the said channel having a drain pipe connected thereto and a valve therein, a by-pass connecting the said channel and the said reservoir, a capillary tube inserted in the liquid in the reservoir below the said by-pass and opening into the channel above the said by-pass, and means for circulating the liquid through the said feed pipe, filter, reservoir, channel, tube and drain pipe.

4. A capillarimeter, comprising in combination, a receptacle containing a liquid, a feed pipe leading to the receptacle, a filter in the said feed pipe, a channel adjacent to the receptacle, the said channel having a drain pipe connected thereto and a valve therein, a by-pass connecting the said receptacle and the channel, a capillary tube inserted at one end in the said receptacle below the said by-pass and the opposite end in the said channel above the said by-pass, a scale contiguous to the tube, and means for intermittently filling and draining the receptacle, and intermittently circulating the liquid under pressure through the said feed pipe, receptacle, channel, tube and drain pipe.

5. An apparatus for determining the content of a liquid, consisting of, in combination, a chamber having a cavity, the lower end of said cavity forming a reservoir, a channel adjacent the cavity and the reservoir, a by-pass connecting the cavity and the channel, a capillary tube inserted in the reservoir and leading into the channel, a scale on the outside of the chamber and adjacent the tube.

6. An apparatus for determining the content of a liquid, consisting of in combination, a chamber having a reservoir, a channel adjacent to the reservoir, a by-pass connecting the reservoir and the channel, a valve in the channel, a capillary tube inserted in the reservoir below the said by-pass and opening into the channel above the said by-pass, and a visible scale on the outside of the chamber and adjacent to the capillary tube.

7. In a capillarimeter, a chamber block having an aperture therethrough, a cavity therein adjacent to the aperture, a by-pass within the said block connecting the aperture and the cavity, the said block also having two holes, one opening into the cavity below the by-pass and the other opening into the aperture above the by-pass.

ELMER J. RICHLEY.